US012791726B2

(12) United States Patent
Li et al.

(10) Patent No.: US 12,791,726 B2
(45) Date of Patent: Nov. 10, 2026

(54) FLEXIBLE LIDAR CAMERA SYNCHRONIZATION FOR DRIVERLESS VEHICLE

(71) Applicants: Baidu USA LLC, Sunnyvale, CA (US); APOLLO INTELLIGENT DRIVING TECHNOLOGY (BEIJING) CO., LTD., Beijing (CN)

(72) Inventors: Xianfei Li, Beijing (CN); Zirui Huang, Beijing (CN); Manjiang Zhang, Sunnyvale, CA (US)

(73) Assignees: BAIDU USA LLC, Sunnyvale, CA (US); APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 1000 days.

(21) Appl. No.: 18/002,015

(22) PCT Filed: Aug. 31, 2022

(86) PCT No.: PCT/CN2022/116300

§ 371 (c)(1),
(2) Date: Dec. 15, 2022

(87) PCT Pub. No.: WO2024/045069

PCT Pub. Date: Mar. 7, 2024

(65) Prior Publication Data

US 2024/0241261 A1 Jul. 18, 2024

(51) Int. Cl.

| | |
|---|---|
| ***G01S 17/931*** | (2020.01) |
| ***G01S 17/86*** | (2020.01) |
| ***G06T 7/33*** | (2017.01) |
| ***G06T 7/80*** | (2017.01) |

(52) U.S. Cl.
CPC ............ *G01S 17/931* (2020.01); *G01S 17/86* (2020.01); *G06T 7/33* (2017.01); *G06T 7/80* (2017.01); *B60W 2420/403* (2013.01); *B60W 2420/408* (2024.01); *G06T 2207/30252* (2013.01)

(58) Field of Classification Search
CPC ................................ G01S 17/86; G01S 7/497
See application file for complete search history.

(56) References Cited

U.S. PATENT DOCUMENTS 5,515,099 A * 5/1996 Cortjens .................. H04N 7/15 348/E7.083
2024/0045027 A1 * 2/2024 Zhang .................. G01S 7/4808

FOREIGN PATENT DOCUMENTS

CN 112485806 A * 3/2021 ............... G01S 7/48

* cited by examiner

*Primary Examiner* — Helal A Algahaim
*Assistant Examiner* — Clara G Chilton
(74) *Attorney, Agent, or Firm* — WOMBLE BOND DICKINSON (US) LLP

(57) ABSTRACT

In one aspect, a computing device of an autonomous driving vehicle (ADV) is configured to determine a first control signal for a light detection and ranging (Lidar) sensor of the ADV and a second control signal for a camera of the ADV, provide the first control signal to the Lidar sensor and the second control signal to the camera, and process Lidar output of the Lidar sensor and camera output of the camera to detect one or more features of the Lidar output or camera output. In response to detecting the one or more features, the computing device is to adjust the first control signal or the second control signal.

20 Claims, 8 Drawing Sheets

FLEXIBLE LIDAR CAMERA SYNCHRONIZATION FOR DRIVERLESS VEHICLE

CROSS-REFERENCE TO RELATED APPLICATIONS

This application is a National Stage of International Application No. PCT/CN2022/116300, filed Aug. 31, 2022, which is hereby incorporated by reference in its entirety.

FIELD

Embodiments of the present disclosure relate generally to operating autonomous driving vehicles. More particularly, embodiments of the disclosure relate to synchronization of Lidar sensor and camera for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle (ADV) may include one or more image (e.g., cameras, a Lidar sensor, etc.,) to capture a surrounding environment of the ADV. The surrounding environment may include the physical environment around the ADV such as roads, other vehicles, buildings, people, objects, etc. Each image sensor may produce an image stream. The number of image sensors may vary from one vehicle to another. Various image sensors may be placed at different positions to capture the environment from its perspective, such as from a given location at a given angle relative to the ADV.

Lidar and camera are two main sensors in an ADV. A Lidar sensor determines ranges (variable distance) by targeting an object or a surface with a laser and measuring the time for the reflected light to return to the receiver. It can also be used to make digital 3-D representations of the environment around the ADV, which may include e.g., walls, buildings, pedestrians, vehicles, trees, and other objects. Lidar uses ultraviolet, visible, or near infrared light to image objects. A camera may sense light in its surroundings and generate images based on the sensed light. And ADV may include one or more cameras that capture the environment from different angles.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect. It should be understood that some of the embodiments shown may be combined with other embodiments even if not shown as such in each figure.

DETAILED DESCRIPTION

Figure 1:
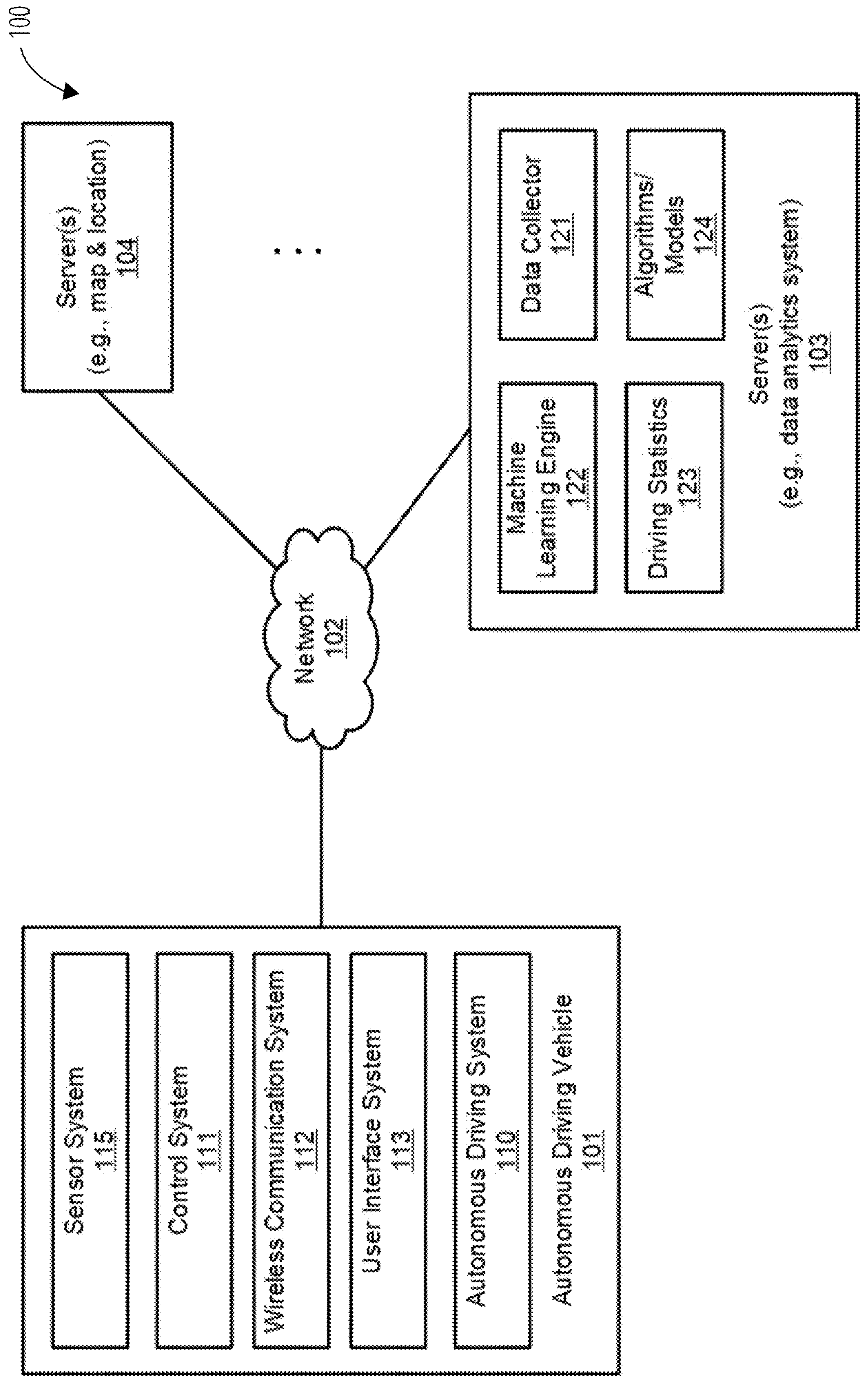
FIG. 1 is a block diagram illustrating a networked system, in accordance with some embodiments.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Sensor fusion, which is the processing of information from multiple sensors to understand the environment around an autonomous driving vehicle (ADV), requires synchronized data between the multiple sensors with a high accuracy. ADVs that are on the road may operate under harsh conditions such as, for example, dynamic forces (e.g., vibration, shock) and high and low temperatures. Over time, sensor data quality may suffer due to changes or shifts in timing. The environmental conditions may cause changes in the timing of various sensor data which, over time, may affect the ability of the ADV to properly sense its surrounding environment.

In conventional systems, software timestamp information may be included with sensed data to measure sensor data synchronization. Control signals for various sensors, however, are not accurate due to software process variation. Some control systems may provide a hardware level signal control for data acquisition. Hardware level signal control may include a camera trigger or other wave form that a sensor may take as input and perform actions based on. Due to the harsh conditions in an ADV environment, and the importance of fusion of sensor data from various sensors, a simple control signal itself may not provide consistent and reliable results. Conventional systems lack a management solution to properly ensure synchronization of a Lidar sensor and a camera.

According to some embodiments, a sensor synchronization module of an ADV may include a hardware design that provides flexible and redundant sensor signal control with a fast response time. The module or system may include multiple levels of status monitor and control to improve system stability and control signal accuracy. The system may detect when the Lidar sensor and camera exhibit behavior that puts data synchronization at risk and respond accordingly.

In one aspect, a method, performed by a computing device of an autonomous driving vehicle (ADV), includes determining a first control signal for a light detection and ranging (Lidar) sensor of the ADV and a second control signal for a camera of the ADV, providing the first control signal to the Lidar sensor and the second control signal to the camera, processing Lidar output of the Lidar sensor and camera output of the camera to detect one or more features of the Lidar output or camera output, and in response to detecting the one or more features, adjusting the first control signal (to the Lidar sensor) or the second control signal (to the camera). In such a manner, the method may incorporate feedback (e.g., the output of the sensors) to determine if the data from the sensors are at risk and respond accordingly.

In some examples, determining the first control signal and determining the second control signal includes selecting the first control signal based at least on a Lidar type of the Lidar sensor, and selecting the second control signal based at least on a camera type of the camera.

In some examples, adjusting the first control signal or the second control signal includes adjusting the first control signal or the second control signal to synchronize the Lidar sensor with the camera. This may include calculating the control signals so that the Lidar and camera perform image capture at synchronized intervals (even if the rate is different) or aligning at least one image of the Lidar with the camera in a given control cycle. In some examples, this may include aligning the Lidar sensor and the camera according to a common reference (e.g., a common clock).

In some examples, the one or more features includes a drift in the Lidar output or the camera output. A drift may be understood as a deviation from an expected timing to an actual timing of an event (e.g., an image capture) from the Lidar sensor or the camera, or both. Over time, these deviations may result in increase in temporal offset of each event. As such, the system may detect the drift and respond by adjusting the control signal to the Lidar sensor or the camera, or both.

Additionally, or alternatively, the one or more features includes a temporal misalignment between the Lidar output and the camera output. A temporal misalignment may be determined based on a difference between a timestamped frame of the Lidar sensor and a timestamped frame of the camera. The system may detect such a misalignment and respond by adjusting the control signal to the Lidar sensor or the camera, or both.

In some examples, in response to the one or more features satisfying a fault threshold, the system logs the one or more features (e.g., in a fault log). The log may be stored in computer-readable memory (e.g., non-volatile memory). Each occurrence of a feature may be stored as a record and provide a history of sensor behavior for fault detection or troubleshooting. Additionally, or alternatively, the system may trigger a fault response, such as providing an alert of notification to a user. In some examples, the fault threshold may be satisfied by a timing of the Lidar output or of the camera output being different from an expected timing (e.g., a manufacturer specification) by a threshold amount. In some examples, the fault threshold may be satisfied by missing data of the Lidar output or the camera output.

In some examples, adjusting the first control signal or the second control signal includes switching from a non per-frame control signal to a per-frame control signal. For example, a per-frame control signal may include a pulse where each pulse represents a command for the sensor to perform an action (e.g., capture an image, open shutter, etc.). Such a control signal gives the system more granular control of the Lidar sensor or camera. A non per-frame control signal may include a pulse per second control signal that pulses once a second or at another interval that is not on a per-frame basis. The Lidar sensor or camera may receive such a signal and synchronize its own events within that second based on the pulse per second. Such a non per-frame control signal may provide insufficient synchronization in some cases where the internal timing mechanism of the Lidar sensor or the camera behaves out of specification (e.g., the timing is irregular or out of specification). In other examples, a non per-frame control signal may include a command to the Lidar or the camera to operate at 'X' capture rate indefinitely, in which case the internal timing mechanism of the Lidar sensor or the camera is relied upon more heavily. Thus, the system may switch from a non per-frame control signal to a per-frame control signal (with higher granularity and control) to reduce reliance on the internal mechanism of a given sensor (e.g., the Lidar sensor or the camera). This adjustment may be beneficial when those internal mechanisms fall out of specification or otherwise misbehave.

In some examples, adjusting the first control signal or the second control signal includes switching to a per-frame control signal from a non per-frame control signal. For example, if the Lidar sensor and the camera are misaligned with per-frame control, or one of the sensors is misfiring or misbehaving with per-frame control, the system may switch its control signal to a non per-frame control signal, in an attempt to alter the sensor's behavior with a different type of control signal.

In some examples, adjusting the first control signal or the second control signal includes increasing or decreasing a frequency of the first control signal or the second control signal. For example, the system may decrease the frequency or rate of a signal and analyze the response of the sensor. If the sensor timing improves, or synchronization improves, then the system may keep the control signal as adjusted or continue to decrease the frequency or rate of the signal. If the timing worsens, then the frequency or rate may be increased. Again, the timing may be monitored until the system determines whether increasing or decreasing the control signal rate improves the timing or synchronization of the sensors.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
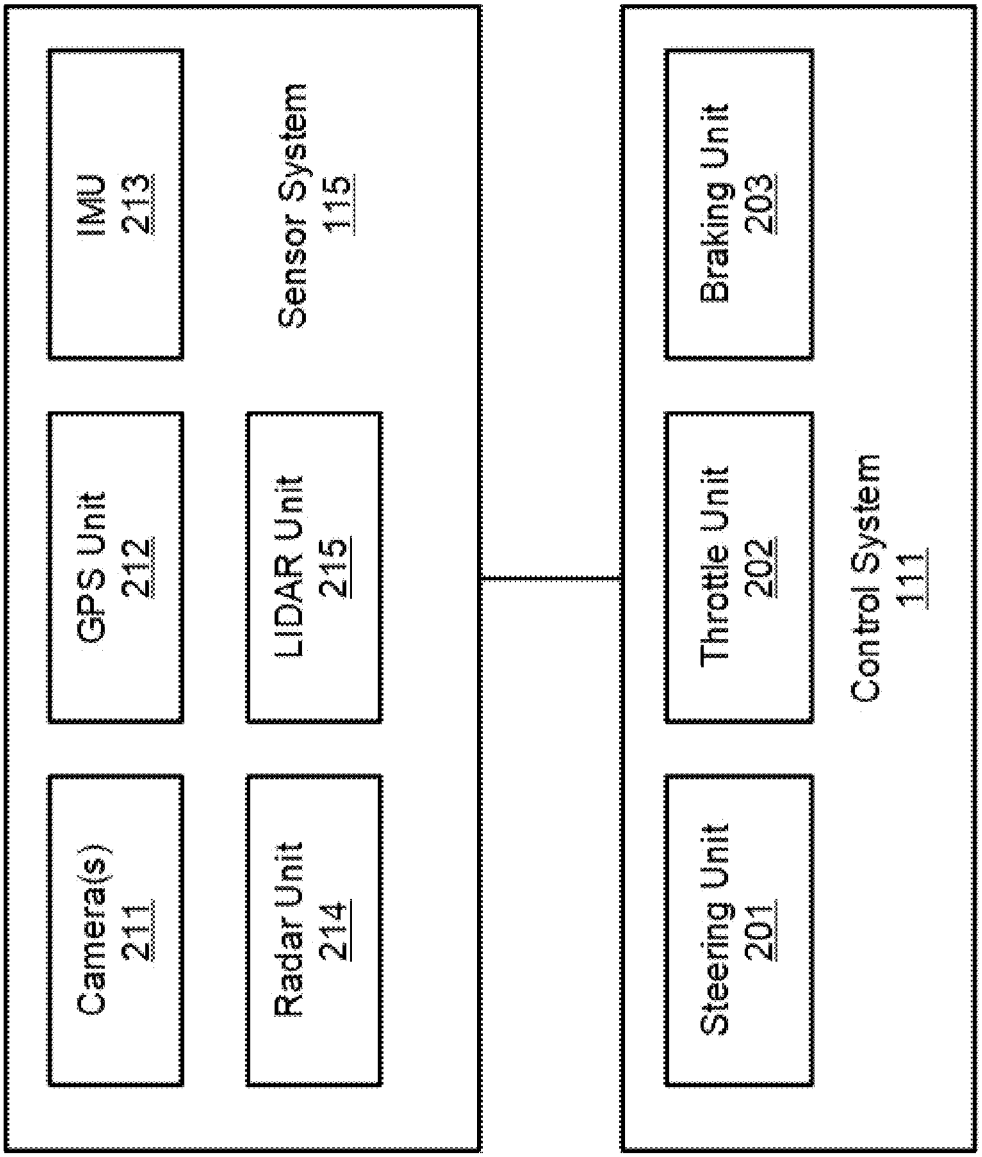
FIG. 2 is a block diagram illustrating an example of an autonomous driving vehicle, in accordance with some embodiments.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently. Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
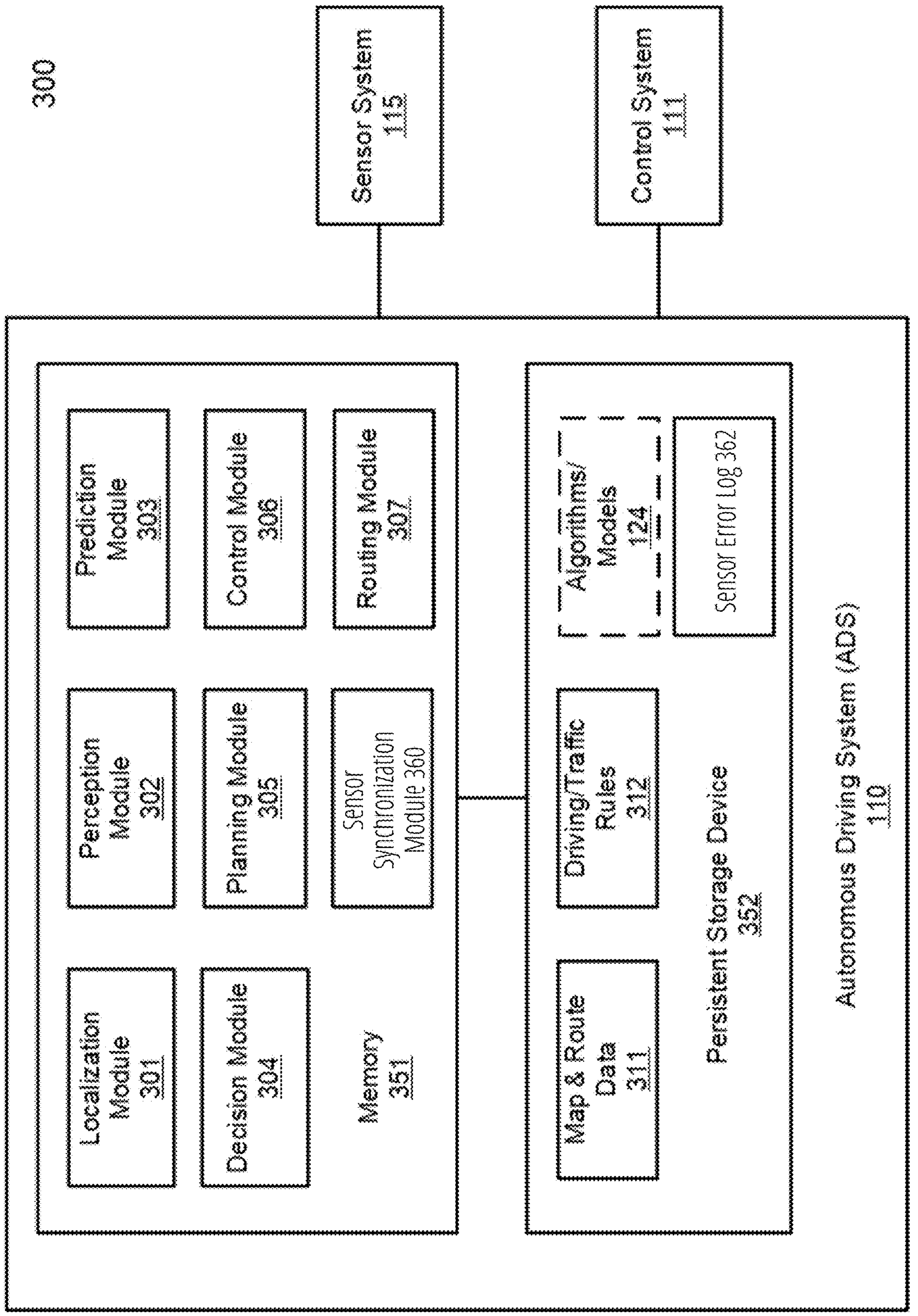
FIG. 3A shows a block diagram illustrating an example of an autonomous driving system used with an autonomous driving vehicle, in accordance with some embodiments.
Figure 3B:
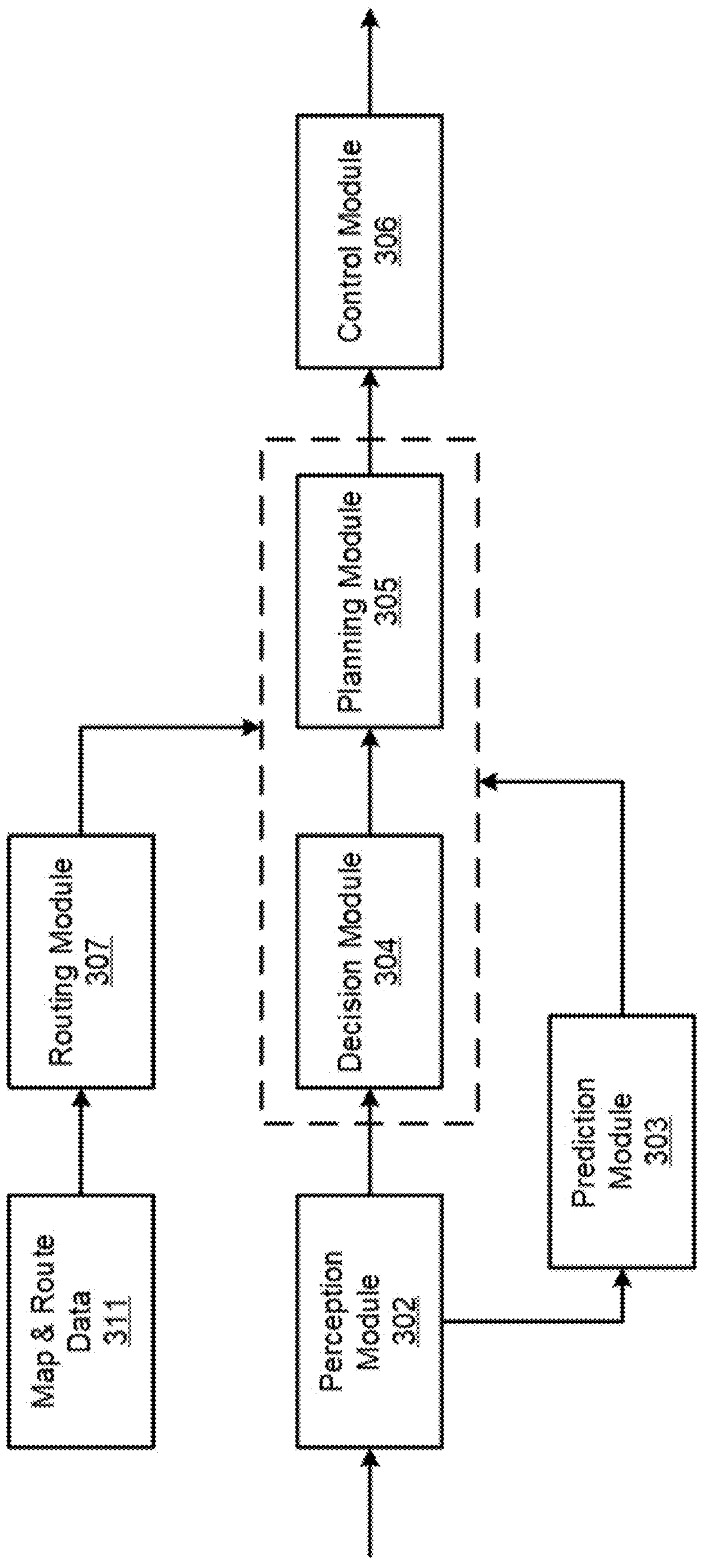
FIG. 3B shows a block diagram illustrating an example of an autonomous driving system used with an autonomous driving vehicle, in accordance with some embodiments.

FIG. 3A and FIG. 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307 [fill in additional modules here].

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

In some aspects, autonomous driving system 110 includes a sensor synchronization module 360. The sensor synchronization module 360 may be configured to determine a first control signal for a light detection and ranging (Lidar) sensor of the ADV and a second control signal for a camera of the ADV. The Lidar sensor and the camera sensor may be part of sensor system 115. For example, the Lidar sensor may correspond to Lidar unit 215 and the camera sensor may correspond to any of cameras 211. The sensor synchronization module 360 may determine the respective control signals for the Lidar sensor and the camera based on the type of Lidar sensor and the type of camera.

The sensor synchronization module 360 may provide the first control signal to the Lidar sensor and the second control signal to the camera. The sensor synchronization module 360 may process Lidar output of the Lidar sensor and camera output of the camera to detect one or more features of the Lidar output or camera output. The one or more features may relate to timing of the output. For example, the respective outputs may include one or more frames with timestamped information. The one or more features may indicate drift of the Lidar sensor, alignment of the Lidar sensor and the camera, or other features.

In response to detecting the one or more features, the sensor synchronization module 360 may adjust the first control signal or the second control signal. For example, the frequency of a control signal may be increased or reduced to reduce a misalignment between the Lidar sensor and the camera. In another example, if the Lidar sensor is indicating drift or other timing issues, the control signal to the Lidar sensor may be changed from one type of control signal (e.g., a pulse per second (PPS) or command signal) to a different type of signal. This may be repeated until the one or more features (e.g., a timing related issue) is no longer detected in the output of the Lidar sensor or the camera.

The sensor synchronization module 360 may log the one or more features and trigger a fault response, in response to the one or more features satisfying a fault threshold. The fault threshold may be satisfied by a timing of the Lidar output or of the camera output being different from an expected timing by a threshold amount. For example, if output of the camera or the Lidar sensor has a frame that is early or late, or has a drift that is beyond a threshold amount, or if the alignment of the sensors (relative to each other) are beyond a threshold amount, or a combination thereof, the sensor synchronization module 360 may detect any of these as a feature and store a record of such an occurrence in sensor error log 362.

Additionally, or alternatively, the fault threshold may be satisfied by missing data of the Lidar output or the camera output. This may be treated as a severe feature. The error log may include an error code, text that indicates the details of the error (e.g., 'Lidar frame X is missing', 'camera frames exceed expected amount', etc.). The error log 362 may be stored in computer-readable memory (e.g., non-volatile computer-readable memory). Other aspects of a sensor synchronization module are further described in other sections.

Figure 4:
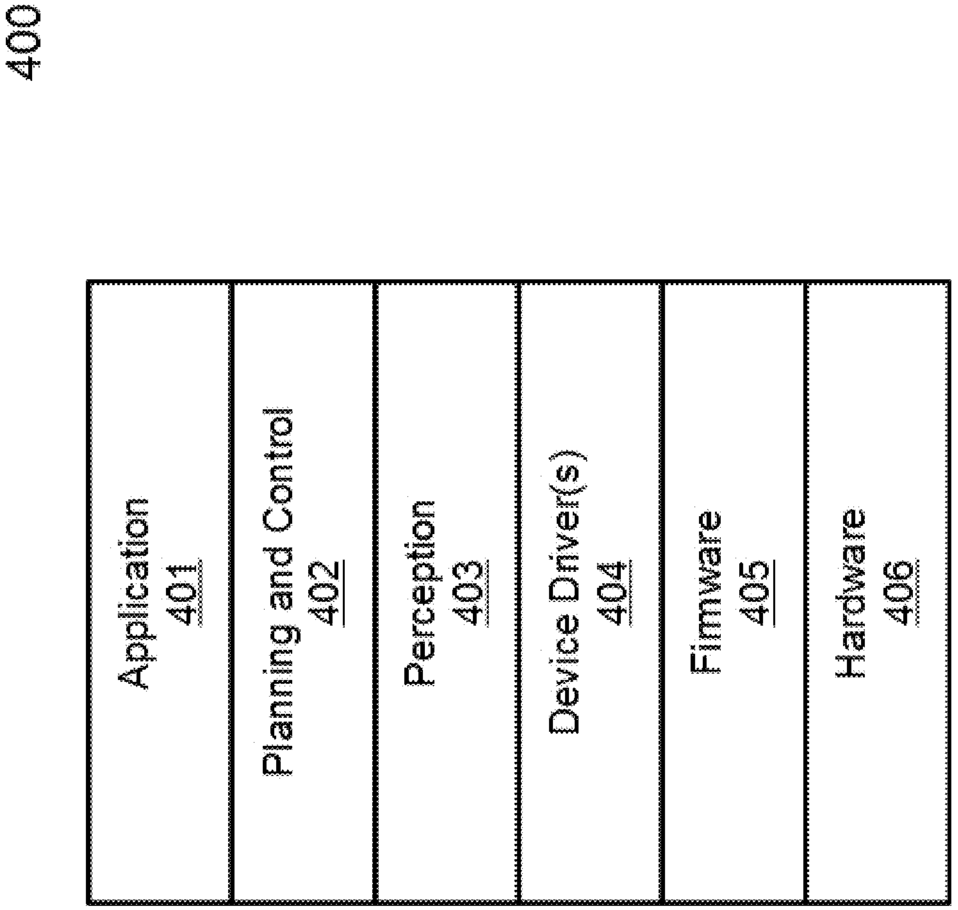
FIG. 4 is a block diagram illustrating system architecture for autonomous driving, in accordance with some embodiments.

FIG. 4 is a block diagram illustrating system architecture for autonomous driving according to one embodiment. System architecture 400 may represent system architecture of an autonomous driving system as shown in FIG. 3A and FIG. 3B.

Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer

402 may include functionalities of at least planning module 305 and control module 306. Perception layer 403 may include functionalities of at least perception module 302.

In one embodiment, there is an additional layer including the functionalities of prediction module 303 and/or decision module 304. Alternatively, such functionalities may be included in PNC layer 402 and/or perception layer 403.

System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Aspects of the sensor synchronization module as described may be implemented in a combination of the layers such as the hardware layer 406, firmware layer 405, driver layer 404, and application layer 401.

Figure 5:
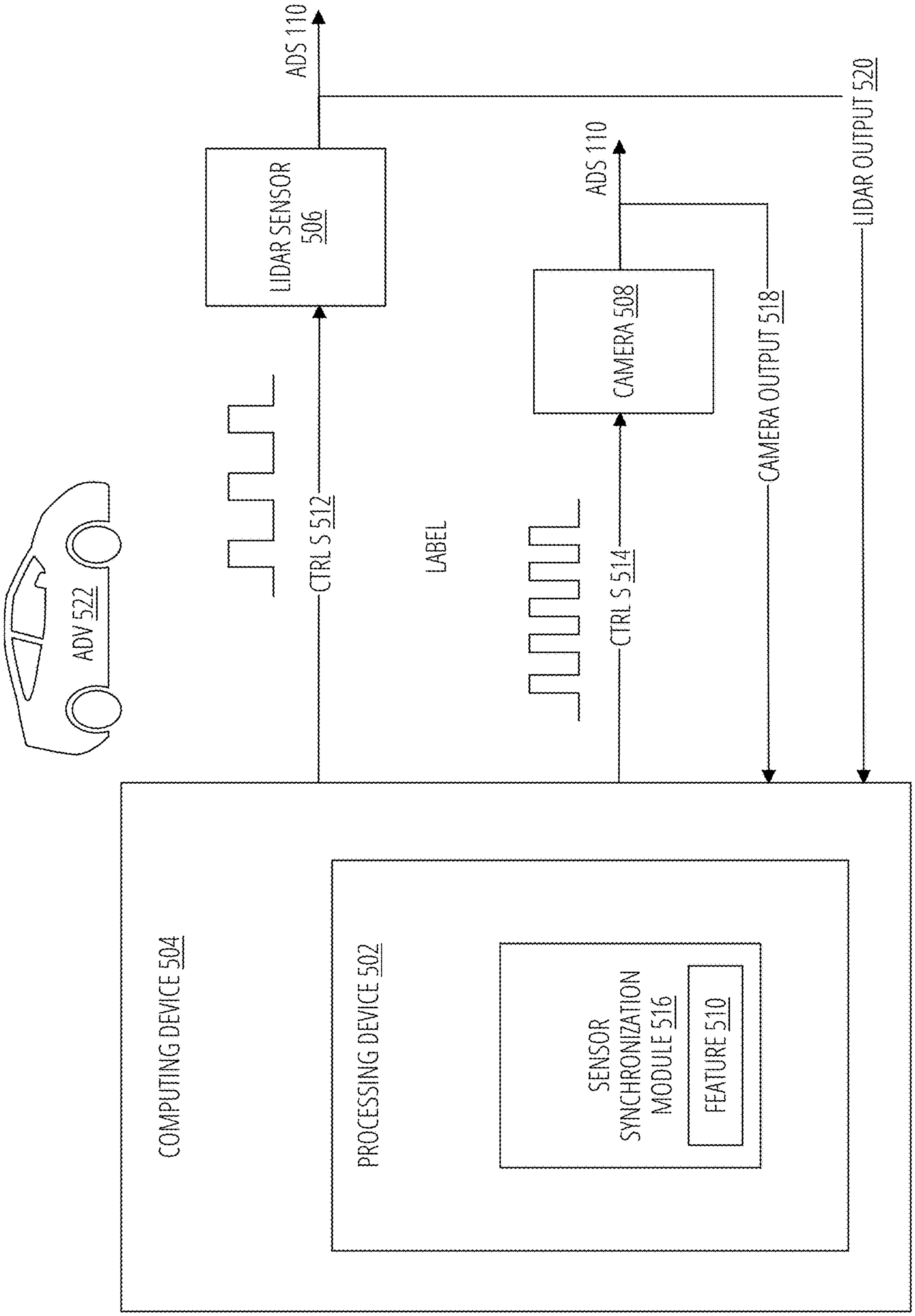
FIG. 5 shows an example of a computing device that may be configured as a sensor synchronization module, in accordance with some embodiments.

FIG. 5 shows an example of a computing device 504 that may be configured as a sensor synchronization module 516, in accordance with some embodiments. The sensor synchronization module 516 may correspond to examples shown in other sections.

Computing device 504 may include processing logic such as processing device 502, which may include memory such as volatile memory devices (e.g., random access memory (RAM)), non-volatile memory devices (e.g., flash memory) and/or other types of memory devices. Processing device 504 may include electronic circuits, programmable logic, a processor (e.g., a central processing unit (CPU), a microprocessor, a digital signal processor, etc.), or a combination thereof. The processing device 504 may be configured to perform the operations described herein the present disclosure.

Processing device 504 may be configured as a sensor synchronization module 516. In some examples, the sensor synchronization module 516 may comprise one or more computer applications that run on processing device 502 to perform operations described herein. In some examples, sensor synchronization module 516 may be configured as hardware (e.g., programmable logic or an electronic circuit), or a combination of hardware and software.

Computing device 504 may be integral to ADV 522. Similarly, lidar sensor 506 and camera 508 may correspond to sensors system 215 and be integral to ADV 522 to sense the environment of the ADV 522. These sensors may be electrically integrated with other described electronic components through printed circuit boards, wires, wireless technology, etc, to help the ADV perform perception of its environment.

Computing device 504 may be configured to determine a first control signal 512 for a Lidar sensor 506 of the ADV and a second control signal 514 for a camera 508 of the ADV. The computing device may provide the first control signal 512 to the Lidar sensor 506 and the second control signal 514 to the camera 508. For example, each control signal may be provided through a conductor (e.g., one or more wires), or wirelessly, or a both. In some examples, the control signals may be digital, and in other examples, the control signal may be analog. In some examples, the computing device 504 may include hardware, software, or a combination thereof that may generate a waveform, or a digital command as an output control signal.

The first control signal 512 may be a pulse per second (PPS) signal that the Lidar sensor uses to align rotation and image capture with. For example, the first control signal 512 may include a pulse or a square wave with a frequency of 1 Hz. The Lidar sensor may include one or more actuators and position sensors and operate its actuators so that it rotates in alignment with the first control signal 512 (e.g., by using the pulse per second as a basis for performing its rotation and image capture). The Lidar sensor may be configured to spin 'X' rotations per second, in alignment with the first control signal 512. It should be understood that The second control signal 514 may include a trigger signal such as, for example, a wave form, a pulse, a square wave, or other trigger signal. The camera may include hardware and software to receive the trigger signal and respond to each trigger (e.g., a rising edge or a falling edge of the waveform) by opening its shutter, receiving light through its aperture, closing its shutter, and processing the sensed light to generate an image.

Computing device 504 may process Lidar output 520 of the Lidar sensor 506 and camera output 518 of the camera 508 to detect one or more features 510 of the Lidar output or camera output. Lidar output 520 may include a sequence of frames where each frame may contain information such as imagery, a corresponding position (e.g., a direction or rotational angle) of the image, and a timestamp corresponding to the imagery. Camera output 518 may include a sequence of frames where each frame may contain a captured image, and a timestamp corresponding to the captured image. Each output may include additional information such as an ID of the corresponding sensor (e.g., a camera ID or a Lidar ID), the make or model of the sensor, or other information that identifies which sensor generated the output, or a type of the sensor. Although not shown, the output from each sensor may be provided to ADS 110 such as for perception and other autonomous driving tasks.

In some examples, determining the first control signal and determining the second control signal includes selecting the first control signal based at least on a Lidar type of the Lidar sensor, and selecting the second control signal based at least on a camera type of the camera. In some examples, the Lidar type and camera type may be determined based on the output of the respective sensor.

Additionally, or alternatively, the respective type of each sensor may be determined from system configuration data. For example, computing device 504 may access a system configuration file (e.g., stored in computer-readable memory) that indicates a make, a model, or a type of the Lidar and the camera. The Lidar type may include the type of control signals that the onboard Lidar sensor 506 may take as input. Similarly, the camera type may include the type of control signals that the onboard camera 508 may take as input. Based on this information, the sensor synchronization module 516 may select a default control signal such as control signal 512 and 514 for each sensor. The default control signal may be selected as one of the compatible control signal types for that sensor type.

In response to detecting the one or more features, computing device 504 may adjust the first control signal 512 or the second control signal 514, or both. This adjustment may be performed to synchronize the Lidar sensor and the camera. For example, the control signal 514 of the camera may be adjusted to slow down or speed up, resulting in a reduced temporal misalignment between the camera output 518 with the lidar output 520.

In some examples, the one or more features 510 may include a drift in the Lidar output or the camera output. For example, sensor synchronization module 516 may analyze the camera output 518 over multiple frames to determine if the timing of the image capture is drifting. If the drift goes beyond a threshold amount, the sensor synchronization module 516 may switch the control signal 514 from a first type of control signal (e.g., a non trigger-based signal) to a second type of control signal (e.g., a trigger-based control signal). Similarly, sensor synchronization module 516 may analyze lidar output 520 over multiple frames to determine if the timing of the Lidar sensor 506 is drifting. If the drift goes beyond a threshold amount, the sensor synchronization module 516 may switch the control signal 512 from a first type of control signal (e.g., a pulse per second control signal) to a second type of control signal (e.g., a trigger-based control signal).

In some examples, adjusting the first control signal or the second control signal includes switching from a non per-frame control signal to a per-frame control signal. Alternatively, adjusting the first control signal or the second control signal includes switching to a per-frame control signal from a non per-frame control signal. A trigger-based control signal may cause the lidar sensor or the camera to perform a capture at each trigger (e.g., a rising edge or falling edge). Thus, a trigger-based control signal may be understood as a per-frame control signal. A non per-frame control signal may be a pulse per second control signal, or a command signal such as ('operate at 1000 Hz'), in which case the receiving sensor will rely on its own internal timing mechanism to perform its image capture.

In some examples, adjusting the first control signal or the second control signal includes increasing or decreasing a frequency of the first control signal or the second control signal. The sensor synchronization module 516 may re-examine the corresponding output of the adjusted sensor to determine if the one or more features are still present. The sensor synchronization module 516 may continue to increase or decrease the frequency of the first or second control signal until the one or more features are no longer present.

In some examples, the one or more features 510 may include a temporal misalignment between the Lidar output and the camera output. The sensor synchronization module 516 may compare timestamps of the lidar output 520 and camera output 518 frame-by-frame to determine whether the outputs are temporally aligned. For example, the capture rate of the camera 508 may correspond to the capture rate of the lidar sensor 506 at a known or expected ratio. The sensor synchronization module 516 may compare the timestamp of every N number of camera output frames to the timestamp of every S number of lidar sensor output frames, to determine if they are temporally aligned.

Figure 6:
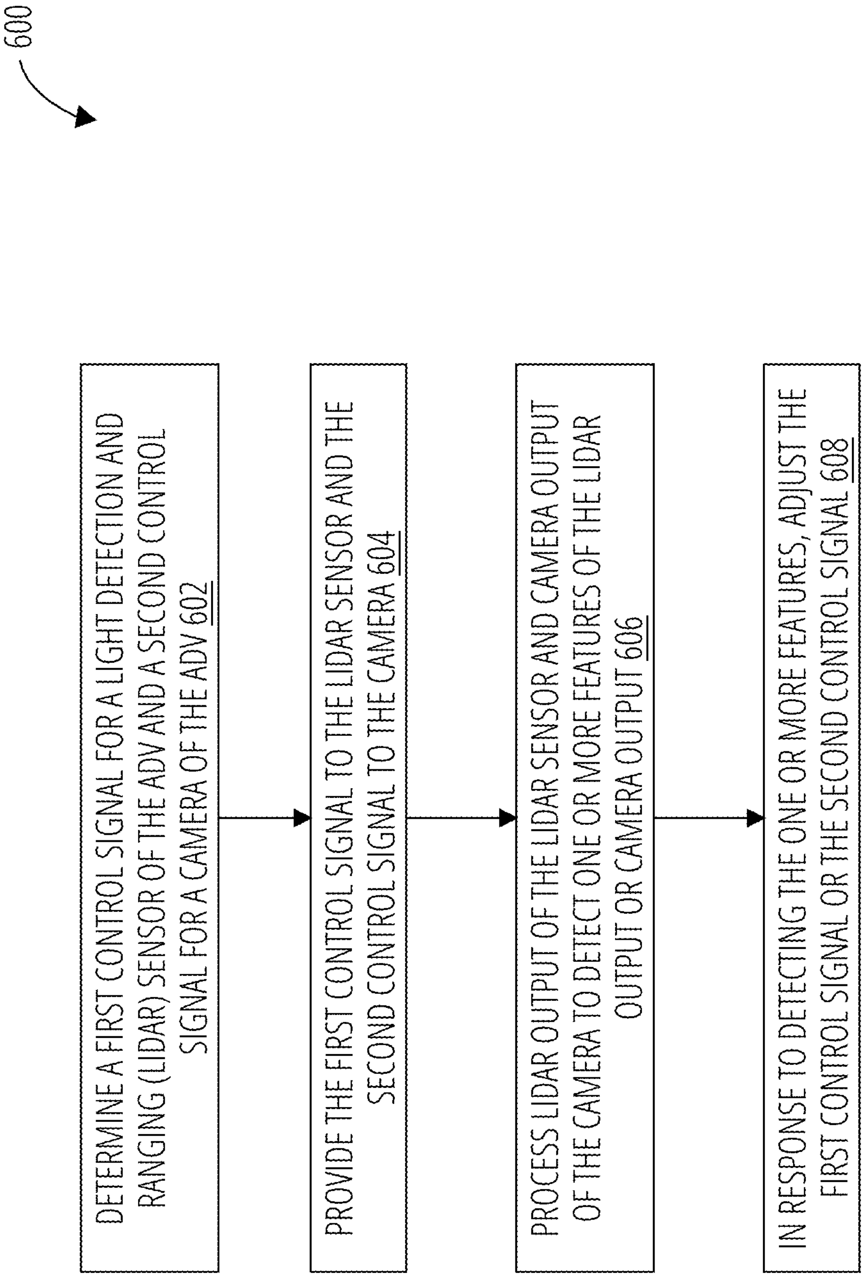
FIG. 6 illustrates an example method for synchronizing a lidar sensor and a camera of an ADV, in accordance with some embodiments.

FIG. 6 illustrates an example method 600 for synchronizing a lidar sensor and a camera of an ADV, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 6, method 600 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 500 may be performed in an order different than presented, and that not all of the blocks in the method may be performed.

At block 602, processing logic determines a first control signal for a light detection and ranging (Lidar) sensor of the ADV and a second control signal for a camera of the ADV. In some examples, determining the first control signal and determining the second control signal includes selecting the first control signal based at least on a Lidar type of the Lidar sensor, and selecting the second control signal based at least on a camera type of the camera. For example, processing logic may refer to a system configuration or settings which may be stored in electronic memory to determine what the Lidar type is and what the camera type is. The Lidar type may indicate what control signals are compatible with this Lidar type. If multiple control signals are supported, processing logic may use a default control signal (e.g., a pulse per second control signal) for Lidar and a default trigger signal (e.g., at a predefined frequency) for the camera.

At block 604, processing logic provides the first control signal to the Lidar sensor and the second control signal to the camera. For example, processing logic may generate an electronic control signal (e.g., a waveform or a digital message) for each of the Lidar sensor and the camera and transmit each electronic control signal to an input port of each sensor. Each sensor and may be configured to decode the signal and perform capture events using the timing of the control signal as a basis for timing its own actions. For the Lidar sensor, this may include rotating a prescribed amount and generating an image from the rotated position. For the camera this may include opening a shutter, generating an image based on sensed information from light that passes through the aperture of the camera, and closing the shutter.

At block 606, processing logic may process Lidar output of the Lidar sensor and camera output of the camera to detect one or more features of the Lidar output or camera output. This may include scanning through each output in real-time, automatically (e.g., without input of a human) to determine if a sensor is drifting. The output may be scanned on a frame-by-frame basis. Drift may be sensed when the time (as indicated by the timestamps) between output frames grows or shrinks over time. Similarly, processing logic may compare timestamps of frames of outputs from the two sensors to determine if the output from the two sensors become temporally misaligned.

At block 608, in response to detecting the one or more features, processing logic may adjust the first control signal or the second control signal. For example, if one or more features are detected in the Lidar output, then the first control signal (to the Lidar sensor) may be adjusted. If the one or more features are detected in the camera output, then the second control signal (to the camera) may be adjusted. In some examples, if the one or more features indicate a misalignment, then the processing logic may adjust a frequency of the trigger signal of the camera to reduce the misalignment.

Processing logic may obtain the sensor outputs to detect whether one or more features are present (e.g., at block 606), and if they are, processing logic may adjust the control signal to a different compatible control signal (e.g., a per-frame control signal). Processing logic may, in some cases, try only those control signals that are compatible, and try a different control signal until the output of both sensors no longer exhibit the detected feature or features.

In some examples, at block 608, adjusting the first control signal or the second control signal includes adjusting the first control signal or the second control signal to synchronize the Lidar sensor and the camera. Adjusting the first control signal or the second control signal may include switching from a non per-frame control signal to a per-frame control signal, or switching to a per-frame control signal from a non per-frame control signal. In some examples, adjusting the first control signal or the second control signal includes increasing or decreasing a frequency of the first control signal or the second control signal.

In some examples, the one or more features includes a drift in the Lidar output or the camera output. The control signal of the drifting sensor may be adjusted. For example, if the Lidar output is drifting, processing logic may switch from a pulse per second control signal to a per-frame control signal.

Processing logic may perform additional fault monitoring operations. For example, in response to the one or more features satisfying a fault threshold, processing logic may log the one or more features and trigger a fault response. The fault threshold may be satisfied by a timing of the Lidar output or of the camera output being different from an expected timing by a threshold amount. For example, if the drift of the Lidar output is greater than a manufacturer specified tolerance of 'X', processing logic may trigger a fault response such as generating a notification or alert to a user, or storing a digital record of the fault. Additionally, or alternatively, the fault threshold is satisfied by missing data of the Lidar output or the camera output.

Figure 7:
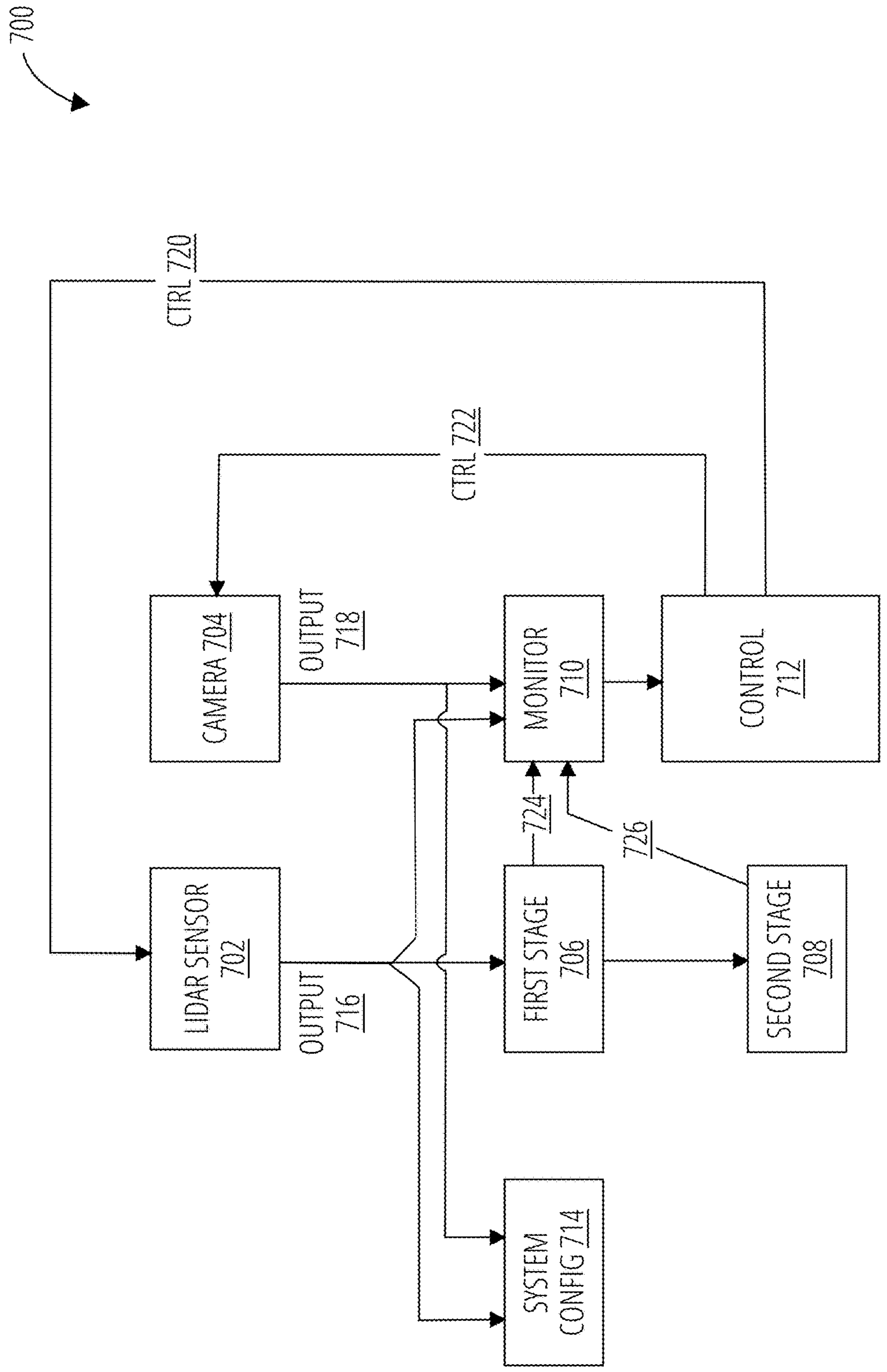
FIG. 7 shows an example workflow for managing control of a lidar sensor and a camera to improve synchronization and sensor fusion of an ADV, in accordance with some embodiments.

FIG. 7 shows a system 700 for managing control of a lidar sensor and a camera to improve synchronization and sensor fusion of an ADV, in accordance with some embodiments.

At control block 712, the system 700 may determining a first control signal 720 for a lidar sensor 702 of the ADV and a second control signal 722 for a camera 722 of the ADV. The system may provide first control signal 720 to the Lidar sensor 702 and the second control signal 722 to the camera 704. The control signals may be provided as an electric signal such as an analog signal, a digital signal, a waveform, or other electric signal. The electric signal may be a time-varying electric signal that has a frequency indicative of the capture rate of the sensor. Additionally, or alternatively, the control signal may be provided as a message (e.g., a command message) that may be communicated over one or more known communication protocols (e.g., TCP/IP).

System configuration block 714 may select and match Lidar and camera types with each other or with different types of control signals. The lidar sensor 702 may take one or more different types of control signals. Similarly, the camera 704 may take one or more different types of control signals. System configuration 714 may include computer readable memory that stores a type of lidar sensor 702 and a type of camera 704. The type may include a make or model or an enumerated type. The type may include the different control signals that are compatible with the lidar sensor 702 or the camera 704. For example, system configuration 714 may have data that indicates lidar sensor 702 can only take a pulse per second signal and camera 704 can take a trigger signal or a non-trigger signal input (e.g., a digital command). In some examples, the system may analyze the output 716 and output 718 to determine the Lidar sensor type or camera type. The type may be determined based on the output signature (e.g., format) or metadata in the output.

At first stage block 706, the system 700 may process Lidar output 716 of the Lidar sensor 702 and camera output 718 of the camera 704 to detect one or more features of the Lidar output or camera output. As described, the features may relate to temporal misalignments as indicated by a comparison of timestamps of the outputs, or to drift of one or both of the sensors, or a combination thereof. In some cases, an output may be missing a frame or data in a frame may be missing. The first stage block may support time synchronization such as adjustment of a PPS signal or other control signal to synchronize (e.g., temporally align) the image capture of the camera and the lidar sensor.

At monitor block 710, the system 700 may record detected features such as individual sensor behavior and data drift between different sensors. In response to detecting the one or more features, the system may, at control block 712, adjust the first control signal 720, the second control signal 722, or both.

In some examples, the system 700 may include a second stage block 708 that performs detection and response for more severe features such as, for example, when Lidar time synchronization is missing or malfunctioning. At second stage block 708 the system may process the output 716 and output 718 to detect if any severe features are present, such as if Lidar time synchronization is missing or malfunctioning, or if frames are missing, or if data is missing in frames. The system may raise a flag if such features are detected in any of the outputs, and proceed to monitor block 710 to store a record of the occurrence. Each record may include a timestamp that corresponds with the detected feature (e.g., a fault) and a description of the detected feature.

At control block 712, the system 700 may perform per second signal adjust (e.g., a pulse per second signal adjustment) to control signal 720, or per-frame control signal adjustment (e.g., a trigger signal), or both. At control block 712, the system may switch between adjustments based on first stage output 724 and second stage output 726. First stage output 724 may include an adjusted control signal that adjusts control signal 722 or control signal 720 in view of a detected feature, such as a drift or a misalignment. Second stage output 726 may include an adjusted control signal that adjusts control signal 722 or control signal 720 in view of a detected severe feature such as if Lidar time synchronization is missing or malfunctioning, if frames are missing, if data is missing in frames, if drift or misalignment exceeds a threshold amount, or a combination thereof.

The system 700 may select the first stage output 724 or the second stage output 726 to adjust the controls, based on system configuration 714, or logic performed at monitor block 710, or a combination thereof. For example, system configuration 714 may indicate to use first stage output 724 unless second stage output 726 is present. If second stage output 726 is present (e.g., a severe feature is detected), then control block 712 may use second stage output 726. At control block 712, the system may implement an electric circuit or other hardware to produce control signal 722 and 720. These control signals may be provided to the respective sensors through wired or wireless communication components (e.g., PCBs, connectors, transceivers, etc.).

The system 700 may perform the operations shown repeatedly and in real-time. Real-time may be understood as performing the operations as the output is generated by each sensor and determining the adjusted control signals immediately, notwithstanding minimal delay due to buffering, transmission, or processing. Each of the blocks 714, 706, 708, 710, and 712 may be understood as modules that may be implemented with one or more computing devices and may include hardware, software, or a combination thereof.

In some examples, some of the operations and blocks in the system are configurable using a programmable logic device such as a field programmable gate array (FPGA) or a system on chip (SoC), which may be integral to processing logic.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method, performed by a computing device of an autonomous driving vehicle (ADV), comprising:

determining a first control signal for a light detection and ranging (Lidar) sensor of the ADV and a second control signal for a camera of the ADV, wherein the first control signal is set as a non per-frame control signal;

providing the first control signal to the Lidar sensor and the second control signal to the camera;

processing Lidar output of the Lidar sensor and camera output of the camera to detect one or more features of the Lidar output or camera output; and in response to detecting the one or more features satisfying a fault threshold, adjusting the first control signal or the second control signal, including adjusting the first control signal to the Lidar sensor to switch from the non per-frame control signal to a per-frame control signal.

2. The method of claim 1, wherein determining the first control signal and determining the second control signal includes selecting the first control signal based at least on a Lidar type of the Lidar sensor, and selecting the second control signal based at least on a camera type of the camera.

3. The method of claim 1, wherein adjusting the first control signal or the second control signal further comprises adjusting the first control signal or the second control signal to synchronize the Lidar sensor and the camera.

4. The method of claim 1, wherein the one or more features includes a drift in the Lidar output or the camera output.

5. The method of claim 1, wherein the one or more features includes a temporal misalignment between the Lidar output and the camera output.

6. The method of claim 1, further comprising in response to the one or more features satisfying the fault threshold, logging the one or more features and triggering a fault response.

7. The method of claim 6, wherein the fault threshold is satisfied by a timing of the Lidar output or of the camera output being different from an expected timing by a threshold amount.

8. The method of claim 6, wherein the fault threshold is satisfied by missing data of the Lidar output or the camera output.

9. The method of claim 1, wherein adjusting the first control signal or the second control signal further includes switching the second control signal to the camera from a non per-frame control signal to a per-frame control signal.

10. The method of claim 1, wherein adjusting the first control signal or the second control signal includes decreasing a frequency of the first control signal or the second control signal.

11. The method of claim 1, wherein adjusting the first control signal or the second control signal includes increasing a frequency of the first control signal or the second control signal.

12. A computing device of an autonomous driving vehicle (ADV), configured to:

determine a first control signal for a light detection and ranging (Lidar) sensor of the ADV and a second control signal for a camera of the ADV, wherein the first control signal is set as a non per-frame control signal;

provide the first control signal to the Lidar sensor and the second control signal to the camera;

process Lidar output of the Lidar sensor and camera output of the camera to detect one or more features of the Lidar output or camera output; and in response to detecting the one or more features satisfying a fault threshold, adjust the first control signal or the second control signal, including adjusting the first control signal to the Lidar sensor to switch from the non per-frame control signal to a per-frame control signal.

13. The computing device of claim 12, wherein determining the first control signal and determining the second control signal includes selecting the first control signal based at least on a Lidar type of the Lidar sensor, and selecting the second control signal based at least on a camera type of the camera.

14. The computing device of claim 12, wherein adjusting the first control signal or the second control signal further comprises adjusting the first control signal or the second control signal to synchronize the Lidar sensor and the camera.

15. The computing device of claim 12, wherein the one or more features includes a drift in the Lidar output or the camera output.

16. The computing device of claim 12, wherein the one or more features includes a temporal misalignment between the Lidar output and the camera output.

17. An autonomous driving vehicle (ADV), comprising a light detection and ranging (Lidar) sensor;

a camera; and a processing device configured to:

determine a first control signal for the Lidar sensor of the ADV and a second control signal for the camera of the ADV, wherein the first control signal is set as a non per-frame control signal, provide the first control signal to the Lidar sensor and the second control signal to the camera, process Lidar output of the Lidar sensor and camera output of the camera to detect one or more features of the Lidar output or camera output, and in response to detecting the one or more features satisfying a fault threshold, adjust the first control signal or the second control signal, including adjusting the first control signal to the Lidar sensor to switch from the non per-frame control signal to a per-frame control signal.

18. The ADV of claim 17, wherein adjusting the first control signal or the second control signal further includes switching the second control signal to the camera from a non per-frame control signal to a per-frame control signal.

19. The ADV of claim 17, wherein adjusting the first control signal or the second control signal includes decreasing a frequency of the first control signal or the second control signal.

20. The ADV of claim 17, wherein adjusting the first control signal or the second control signal includes increasing a frequency of the first control signal or the second control signal.

* * * * *